United States Patent
Tang et al.

(10) Patent No.: US 9,591,067 B2
(45) Date of Patent: Mar. 7, 2017

(54) METHODS AND APPARATUS FOR ALLOCATING CLOUD-BASED MEDIA RESOURCES

(71) Applicant: Haier Group Co., Qingdao (CN)

(72) Inventors: Ruichun Tang, Qingdao (CN); Chao Liu, Qingdao (CN); Yili Zhai, Qingdao (CN)

(73) Assignee: HAIER GROUP CO., Qingdao (CN)

( * ) Notice: Subject to any disclaimer, the term of this patent is extended or adjusted under 35 U.S.C. 154(b) by 141 days.

(21) Appl. No.: 14/444,454

(22) Filed: Jul. 28, 2014

(65) Prior Publication Data

US 2015/0215230 A1    Jul. 30, 2015

(30) Foreign Application Priority Data

Jan. 28, 2014   (CN) .......................... 2014 1 0040681

(51) Int. Cl.
*H04L 12/911*    (2013.01)
*H04L 29/08*    (2006.01)

(52) U.S. Cl.
CPC ........ *H04L 67/1002* (2013.01); *H04L 67/322* (2013.01)

(58) Field of Classification Search
USPC ................. 709/226, 215, 217, 219
See application file for complete search history.

(56) References Cited

U.S. PATENT DOCUMENTS

| | | | |
|---|---|---|---|
| 2012/0311069 A1* | 12/2012 | Robbin ................... | G06F 21/10 709/215 |
| 2012/0311081 A1* | 12/2012 | Robbin ............. | G06F 17/30194 709/217 |
| 2013/0080823 A1* | 3/2013 | Roth ................... | G06F 11/2023 714/4.1 |
| 2014/0075435 A1* | 3/2014 | Assuncao ........... | G06F 9/45558 718/1 |
| 2015/0156081 A1* | 6/2015 | Chakra ............... | H04L 41/5006 709/224 |
| 2016/0078900 A1* | 3/2016 | Baron .............. | H04N 21/21805 386/282 |

* cited by examiner

*Primary Examiner* — Jude Jean Gilles
(74) *Attorney, Agent, or Firm* — Troutman Sanders LLP

(57) ABSTRACT

A method for allocating a cloud-based media resource, comprising: receiving a cloud-based media task request with at least one parameter from a task requester; calculating a second integrated utility value by utilizing the at least one parameter; comparing the second integrated utility value with a first integrated utility value; determining whether to allocate the cloud-based media resource to the task requester according to a result of comparison. An apparatus for allocating a cloud-based media resource according to the present technology is also provided. In some illustrative embodiments, from the view of the utility improvement of cloud-based media services, an objective function is no longer a minimized response time but a maximum utility, and thus the satisfaction of cloud users can be significantly increased.

31 Claims, 3 Drawing Sheets

METHODS AND APPARATUS FOR ALLOCATING CLOUD-BASED MEDIA RESOURCES

CROSS-REFERENCE

This application claims priority to Chinese Patent Application No. 201410040681.4, filed on Jan. 28, 2014, entitled "Methods and Apparatus for Allocating Cloud-Based Media Resources," which is herein incorporated by reference in its entirety.

TECHNICAL FIELD

The present technology generally relates to cloud computing techniques, and in particular, relates to a method and apparatus for allocating cloud-based media resources.

BACKGROUND

Cloud-based media scheduling services abound in the cloud computing area, but are always subject to restrictions of bandwidth and other computing resources in the process of transmission, reducing satisfaction with balanced scheduling services. Reasonable allocation of cloud resources is a way to increase satisfaction of scheduling services in a cloud computing environment. Thus, the technology of cloud based media resource allocation has become a hot research topic recently. One resource allocation model that involves a combinatorial auction mechanism with energy parameters has been presented, which can improve resource utilization of data centers. A linear bandwidth resource allocation scheme has also been put forward by combining the game theory with congestion control algorithms, thus enhancing the utility value of bandwidth. Moreover, to optimize resources of data centers, the game algorithms of load balancing and virtual machine configuration have comprehensively been considered. However, the above-mentioned strategies only designed to allocate resources for consideration based on energy consumption of CPs (Cloud Service Providers). These strategies lack the support to QoS (Quality of Service) properties of CRs (Cloud Service Requesters), and have thus become a bottleneck problem of CR satisfaction improvement. Therefore, it is very significant to make a research on overall satisfaction with common cloud resource allocations.

A common method in the existing technology is to improve satisfaction of scheduling services by meeting Service Level Agreements (SLAs). A SLA based on particle swarm optimization technique has been provided to ensure the balance between resource consumption and performance. A cloud computing framework based on the SLAs has also been provided to sufficiently consider the workloads and geographical locations of distributed data centers and reasonably use the cloud data center. The above strategies lack consideration of the utility value of resource allocation and the overall utility of cloud-based media service is thus low.

SUMMARY

In view of the foregoing, one object of the present technology relates to provide a method for allocating cloud-based media resources. The following summary involves simple concepts for basic understanding of some aspects of the disclosed embodiments or examples. The summary is not a broad overview. The summary neither depicts the crucial/ major component elements nor defines the scope of the examples. It is only directed to present some concepts in a concise form as an introduction to the detailed description.

In some alternative embodiments, a method for allocating a cloud-based media resource, comprises:

receiving a cloud-based media task request with at least one parameter from a task requester;

calculating a second integrated utility value by utilizing the at least one parameter;

comparing the second integrated utility value with a first integrated utility value;

determining whether to allocate a cloud-based media resource to the task requester according to the result of the comparing. Also disclosed is an apparatus for allocating cloud-based media resources. In some illustrative embodiments, from the view of the utility improvement of cloud-based media services, the objective function is no longer the minimized response time but the maximum utility, and thus the satisfaction of cloud users can be significantly increased.

Another object of the present technology is to provide an apparatus for allocating a cloud-based media resource.

In some alternative embodiments, the apparatus for allocating a cloud-based media resource, comprises:

a task scheduling module for receiving a cloud-based media request with at least one parameter from a task requester;

a second module for calculating a second integrated value by utilizing the at least one parameter;

a service negotiation module for comparing the second integrated utility with a first integrated utility value;

a resource allocation module for determining whether to allocate a cloud-based resource to the task requester according to the result of the comparing.

The technical effect according to some illustrative embodiments of the present technology may lie in that: from the view of utility improvement of cloud-based media services, the objective function is no longer the minimized response time but the maximum utility, and thus the satisfaction of cloud users can be significantly increased.

For the above and related objects, one or more embodiments may include the features which will be described below in detail and specifically defined by claims. The below disclosure, in connection with the drawings, illustrates some exemplary aspects of the present technology, and only indicates some of various ways in which the principles of various embodiments may be implemented. Other benefits and novelty of the present technology may become more apparent from the following detailed description, when taken in conjunction with the drawings. The disclosed embodiments are intended to include all the aspects and equivalence thereof.

DETAILED DESCRIPTION

Exemplary embodiments of the present technology will be described below in sufficient detail with reference to the accompanying drawings to enable those skilled in the art to practice them, and it is to be understood that other embodiments may be utilized and that structural, logical and electrical changes may be made without departing from the described embodiments. The embodiments may only represent possible changes and modifications. Separate components and function may be optional and the order of operation may be changed, unless explicitly requested. Some parts and features of some embodiments according to the present technology may be included in or substituted by other embodiments. The scope of embodiments of the present technology includes the whole scope of claims and all the equivalence thereof obtained by claims.

Figure 1:
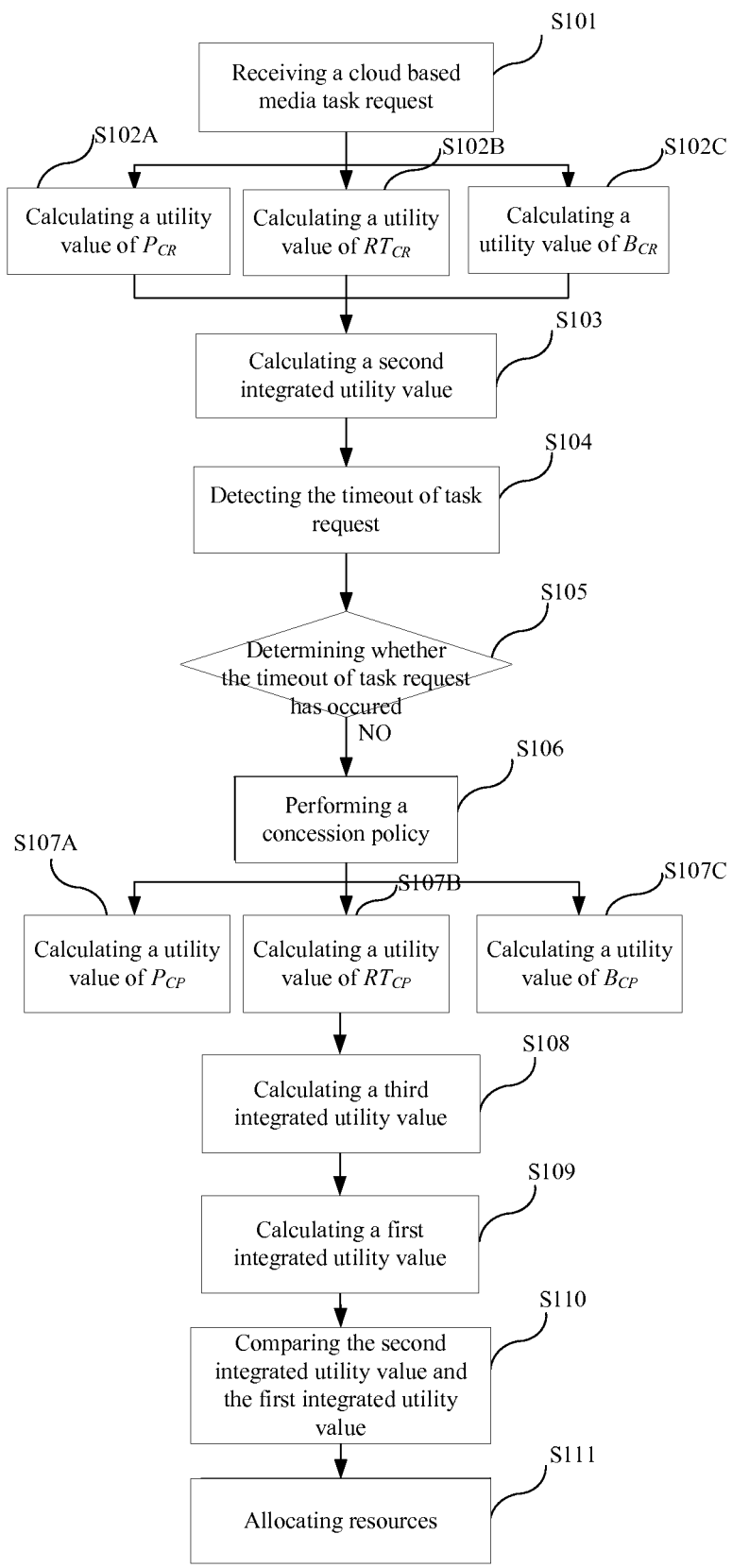
FIG. 1 is a flowchart showing a method for allocating cloud-cased media resources according to some illustrative embodiments of the present technology.

FIG. 1 shows a flowchart of a method for allocating cloud-based media resources. The method may include:

Step S101, receiving a cloud-based media task request from a task requester, wherein the task requester carries at least one parameter;

Step S103, calculating a second integrated utility value by utilizing the at least one parameter;

Step S110, comparing the second integrated utility value with a first integrated utility value;

Step S111, determining whether to allocate cloud-based media resources to the task requester according to the comparison result.

Based on the method, from the view of improving utility of cloud-based media services, the objective function may be no longer the minimized response time but the maximum utility, and thus the satisfaction of cloud users may be significantly increased.

In some illustrative embodiments, the cloud-based media task request may include the following parameters: adjustment factor $P_{CR}$, response time $RT_{CR}$, and bandwidth $B_{CR}$. Preferably, the adjustment factor may be the price.

Since a cloud-based media service request may need to pay a cost for resources, moderate adjustment factors may well reflect the utility of cloud-based media services. Also, since a high requirement on time response for some cloud-based media services such as real time media playing, synchronization of video and audio playing and the like may be needed, such media services may be of certain timeliness. Under such circumstances, reasonable response time may reflect high utility of cloud-based media services. Moreover, the transmitting of cloud-based media may need a lot of adjustment factors, and a moderate bandwidth may thus increase the utility of cloud-based media services. Therefore, the adjustment factors, response time, and bandwidth for cloud-based media services may be used as a collection of the considered QoS parameters, so that the integrated utility value of a cloud-based media service may be obtained by calculating the utility value of each of the parameters to enhance the utility of a cloud-based media service.

In some illustrative embodiments, the method, before step S110, may also include:

Step S109, obtaining an association relationship between a cloud-based media task request and attribute parameters of current cloud-based media resources by utilizing the second integrated utility value $U_{CR}^{total}(P_{CR},RT_{CR},B_{CR})$, wherein $U_{CR}^{total}(P_{CR},RT_{CR},B_{CR})$ may be calculated based on all parameters of the cloud-based task request.

In some illustrative embodiments, step S109 may further include: calculating the association relationship according to the second integrated utility value $U_{CR}^{total}(P_{CR},RT_{CR},B_{CR})$ and a third integrated utility value $U_{CP}^{total}(P_{CP},RT_{CP},B_{CP})$, wherein $P_{CP}$ may represent an adjustment factor, $RT_{CP}$ may represent the response time, and $_{CP}$ may represent the bandwidth.

In some illustrative embodiments, the association relationship may be obtained by calculating the following formula: $U=\omega_{CR}U_{CR}^{total}(P_{CR},RT_{CR},B_{CR})+\omega_{CP}U_{CP}^{total}(P_{CP},RT_{CP},B_{CP})$.

wherein U may be a first integrated utility value; and $U_{CR}^{total}(P_{CR},RT_{CR},B_{CR}) \geq u_{min}^{CR}$, $u_{min}^{CR}$ may be the minimal utility value of the task request; and $U_{CP}^{total}(P_{CR},RT_{CP},B_{CP}) \geq u_{min}^{CP}$, $u_{min}^{CP}$ may be the minimal utility value of the resources; and $\omega_{CR}+\omega_{CP}=1$, $\omega_{CR}$ and $\omega_{CP}$ may be respective weights of the second integrated utility value and the third integrated utility value.

In some illustrative embodiments, the step S103 may include calculating a second integrated utility value according to the following formula:

$$U_{total}^{CR}(P_{CR}, RT_{CR}, B_{CR}) = \begin{cases} 0, & U_P^{CR}(P_{CR}) = 0 \text{ or } U_{RT}^{CR}(RT_{CR}) = 0 \text{ or } U_B^{CR}(B_{CR}) = 0 \\ \omega_P^{CR}U_P^{CR}(P_{CR}) + \omega_{RT}^{CR}U_{RT}^{CR}(RT_{CR}) + \omega_B^{CR}U_B^{CR}(B_{CR}), & \text{others} \end{cases}$$

wherein $\omega_P^{CR}+\omega_{RT}^{CR}+\omega_B^{CR}=1$, $\omega_P^{CR}$, $\omega_{RT}^{CR}$ and $\omega_B^{CR}$ may be respective weights of the utility value $U_P^{CR}(P_{CR})$ of the adjustment factor $P_{CR}$, the utility value $U_{RT}^{CR}(RT_{CR})$ of the response time $RT_{CR}$, and the utility value $U_B^{CR}(B_{CR})$ of the bandwidth $B_{CR}$ of the task request.

Before step S103, the method may further include:

Step S102A, obtaining a utility value of the adjustment factor $P_{CR}$ of the task request according to the following formula:

$$U_P^{CR}(P_{CR}) = \begin{cases} u_{minP}^{CR} + (1 - u_{minP}^{CR}) \cdot \left| \frac{R_P^{CR} - P_{CR}}{R_P^{CR} - I_P^{CR}} \right|, & I_P^{CR} \leq P_{CR} \leq R_P^{CR} \\ 0, & \text{others} \end{cases}$$

wherein $u_{min\,P}^{CR}$ may represent the minimum utility value of the adjustment factor of the cloud-based media task request, $I_P^{CR}$ and $R_P^{CR}$ may represent the most expected adjustment factor and the least expected adjustment factor of the task request, respectively.

Step S102B, obtaining a utility value of the response time $RT_{CR}$ of the task request by calculating the following formula:

$$U_{RT}^{CR}(RT_{CR}) = \begin{cases} u_{minRT}^{CR} + (1 - u_{minRT}^{CR}) \cdot \left| \frac{R_{RT}^{CR} - RT_{CR}}{R_{RT}^{CR} - I_{RT}^{CR}} \right|, & I_{RT}^{CR} \leq RT_{CR} \leq R_{RT}^{CR} \\ 0, & \text{others} \end{cases}$$

wherein $u_{min\,RT}^{CR}$ may represent the minimum utility value of the response time of the task request, $I_{RT}^{CR}$ and $R_{RT}^{CR}$ may represent the most expected response time and the least expected response time of the task request, respectively.

Step S102C, obtaining a utility value of the bandwidth $B_{CR}$ of the task request according to the following formula:

$$U_B^{CR}(B_{CR}) = \begin{cases} u_{minB}^{CR} + (1 - u_{minB}^{CR}) \cdot \left| \dfrac{u(R_B^{CR}) - u(B_{CR})}{u(R_B^{CR}) - u(I_B^{CR})} \right|, & I_B^{CR} \le B_{CR} \le R_B^{CR} \\ 0, & \text{others} \end{cases}$$

wherein $u_{min\,B}^{CR}$ may represent the minimum utility value of the bandwidth of the task request, and $I_B^{CR}$ and $R_B^{CR}$ may represent the most expected bandwidth and the least expected bandwidth of the task request, respectively.

In some illustrative embodiments, $u(B_{CR})$, $u(R_B^{CR})$ and $u(I_B^{CR})$ may be obtained by the following formula:

$$u(X) = \begin{cases} \omega \log X, & I_B^{CR} \le X \le R_B^{CR} \\ 0, & \text{others} \end{cases}$$

wherein $\omega$ may represent the parameter of controlling the shape of a function, and X may be $B_{CR}$, $R_B^{CR}$, or $I_B^{CR}$.

$U_{CP}^{total}(P_{CP}, RT_{CP}, B_{CP})$ may be obtained based on attributes of cloud-based media resources according to the following steps:

In some illustrative embodiments, the method, before Step 109, may include:

Step S108, obtaining a third integrated utility value $U_{CP}^{total}(P_{CP}, RT_{CP}, B_{CP})$ according to the following formula:

$$U_{total}^{CP}(P_{CP}, RT_{CP}, B_{CP}) = \\ \begin{cases} 0, & U_P^{CP}(P_{CP}) = 0 \text{ or } U_{RT}^{CP}(RT_{CP}) = 0 \text{ or} \\ & U_B^{CP}(B_{CP}) = 0 \\ \omega_P^{CP} U_P^{CP}(P_{CP}) + \omega_{RT}^{CP} U_{RT}^{CP}(RT_{CP}) + \\ \quad \omega_B^{CP} U_B^{CP}(B_{CP}), & \text{others} \end{cases}$$

wherein $\omega_P^{CP} + \omega_{RT}^{CP} + \omega_B^{CP} = 1$, $\omega_P^{CP}$, $\omega_{RT}^{CP}$, and $\omega_B^{CP}$ may be respective weights of the utility value $U_P^{CP}(P_{CP})$ of the adjustment factor $P_{CP}$, the utility value $U_{RT}^{CP}(RT_{CP})$ of the response time $RT_{CP}$ and the utility value $U_B^{CP}(B_{CP})$ of the bandwidth $B_{CP}$ of the resources.

In some illustrative embodiments, the method, before Step S108, may further include:

Step S107A, obtaining a utility value of the adjustment factor $P_{CP}$ of the resources according to the following formula:

$$U_P^{CP}(P_{CP}) = \begin{cases} u_{minCP}^{CP} + (1 - u_{minCP}^{CP}) \cdot \left| \dfrac{P_{CP} - R_P^{CP}}{I_P^{CP} - R_P^{CP}} \right|, & R_P^{CP} \le P_{CP} \le I_P^{CP} \\ 0, & \text{others} \end{cases}$$

wherein $u_{min\,P}^{CP}$ may represent the minimum utility value of the adjustment factor $P_{CP}$ of the resources, and $I_P^{CP}$ and $R_P^{CP}$ may represent the initial adjustment factor and the reserved adjustment factor of the adjustment factor $P_{CP}$ of the resources, respectively.

Step S107B, obtaining a utility value of the response time $RT_{CP}$ of the resources according to the following formula:

$$U_{RT}^{CP}(RT_{CP}) = \begin{cases} u_{minCP}^{CP} + (1 - u_{minCP}^{CP}) \cdot \left| \dfrac{RT_{CP} - R_{RT}^{CP}}{I_{RT}^{CP} - R_{RT}^{CP}} \right|, & R_{RT}^{CP} \le RT_{CP} \le I_{RT}^{CP} \\ 0, & \text{others} \end{cases}$$

wherein $u_{min\,RT}^{CP}$ may represent the minimum utility value of the response time of the resources, $I_{RT}^{CP}$ and $R_{RT}^{CP}$ may represent the initial response time and the reserved response time of the resources.

Step S107C, obtaining a utility value of the bandwidth $B_{CP}$ according to the following formula:

$$U_B^{CP}(B_{CP}) = \begin{cases} u_{minB}^{CP} + (1 - u_{minB}^{CP}) \cdot \left| \dfrac{B_{CP} - R_B^{CP}}{I_B^{CP} - R_B^{CP}} \right|, & R_B^{CP} \le B_{CP} \le I_B^{CP} \\ 0, & \text{others} \end{cases}$$

wherein $u_{min\,B}^{CP}$ may represent the minimum utility value of the bandwidth of the resources, and $I_B^{CP}$ and $R_B^{CP}$ may represent the initial bandwidth and the reserved bandwidth of the resources, respectively.

In some illustrative embodiments, step S111 may further include: allocating the current cloud-based media resource to the cloud-based media task request if the first integrated utility value is not less than the second integrated utility value.

In some illustrative embodiments, step S111 may also include: if there are a plurality of cloud-based media resources, the cloud-based task request corresponding to a plurality of first integrated utility values, and each of the plurality of first integrated utility values corresponding to a cloud-based media resource; while, if the maximum value of the plurality of first integrated utility values is not less than the second integrated utility value, allocating the cloud-based media resource corresponding to the maximum first integrated utility value to the cloud-based media task request.

In some illustrative embodiments, the method, after step S103, may also include:

Step S104, detecting the timeout of the task request if the second integrated utility value is zero;

Step S105, determining whether the timeout of the task request occurs;

If the timeout of the task request is determined, the allocating of the cloud-based media resources may end; if no timeout is determined, repeatedly determining the second integrated utility value by executing a concession policy until the second integrated utility value is not zero.

Step 106, executing the concession policy may further include:

obtaining the second integrated utility value of a next task request based on the second integrated utility of the current task request according to the following formula:

$$U_{total}^{CR}(P_{CR}, RT_{CR}, B_{CR})_{t+1} = \\ U_{total}^{CR}(P_{CR}, RT_{CR}, B_{CR})_t - \Delta U_{total}^{CR}$$

wherein $U_{total}^{CR}(P_{CR}, RT_{CR}, B_{CR})_t$ may be the second integrated utility value of the current task request and $\Delta U_{total}^{CR}$ may be a step size of concessions.

If the second integrated utility value of the next task request is not zero, subsequent steps may be carried out.

In some illustrative embodiments, the step size of concessions may be obtained according to the following formula:

$$\Delta U_{total} = U_{total}^t \cdot \left(\frac{t}{\tau}\right)^\lambda$$

wherein τ may be the cut-off time (the maximum number of negotiations may be determined based on τ), t may be the number of negotiations, and λ may be the parameter of controlling concession rates, $0 \le \lambda \le 10$.

Figure 2:
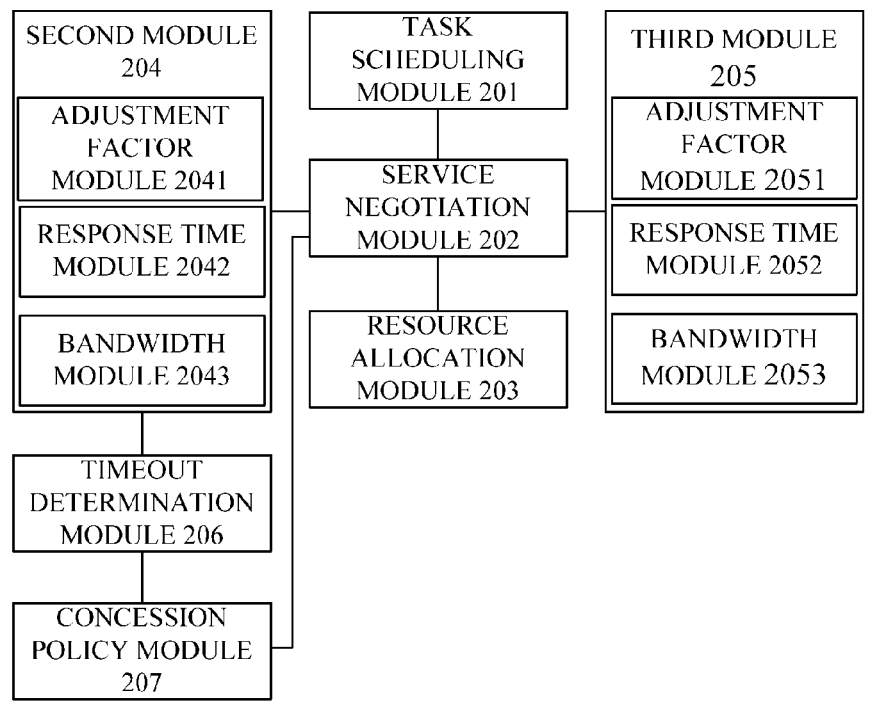
FIG. 2 is a block diagram showing an apparatus for allocating cloud-based media resources according to some illustrative embodiments of the present technology.

With respect to the foregoing method, the present technology may also provide an apparatus for allocating cloud-based media resources. As shown in FIG. 2, the apparatus may comprise:

a task scheduling module 201 for receiving a cloud-based media task request, wherein the cloud-based media task request carries at least one parameter;

a service negotiation module 202 for negotiating an association relationship between parameters of the cloud-based media task request and attribute parameters of a current cloud-based media resource.

a resource allocation module 203 for selecting and allocating suitable cloud-based media resources to the cloud-based media task request according to the association relationship between parameters of the cloud-based media task request and attribute parameters of the current cloud-based media resource.

From the view of utility improvement of cloud-based media services, the objective function of the apparatus may be no longer the minimized response time but the maximum utility, and thus the satisfaction of cloud users may be significantly increased.

In some illustrative embodiments, the cloud-based media task request may include the following parameters: adjustment factor $P_{CR}$, response time $RT_{CR}$, and bandwidth $B_{CR}$.

Since a cloud-based media service request may need to pay a cost for resources, moderate adjustment factors may well reflect the utility of cloud-based media services. Also, since a high requirement on time response for some cloud-based media services such as real time media playing, synchronization of video and audio playing and the like may be needed, such media services may be of certain timeliness. Under such circumstances reasonable response time may reflect high utility of cloud-based media services. Moreover, the transmission of cloud-based media may need a lot of adjustment factors, and a moderate bandwidth may thus increase the utility of cloud-based media services. Therefore, the adjustment factors, response time, and bandwidth for cloud-based media services may be used as a collection of the considered QoS parameters, so that the integrated utility value of a cloud-based media service may be obtained by calculating the utility value of each of the parameters to enhance the utility of a cloud-based media service.

In some illustrative embodiments, the service negotiation module may calculate an association relationship between a cloud-based media task request and the attribute parameters of a current cloud-based media resource by utilizing the second integrated utility value $U_{CR}^{total}(P_{CR},RT_{CR},B_{CR})$, wherein $U_{CR}^{total}(P_{CR},RT_{CR},B_{CR})$ may be calculated based on all parameters of the cloud-based media task request.

In some illustrative embodiments, the service negotiation module may calculate the association relationship by utilizing the second integrated utility value $U_{CR}^{total}(P_{CR},RT_{CR},B_{CR})$ and a third integrated utility value $U_{CP}^{total}(P_{CP},RT_{CP},B_{CP})$, wherein $U_{CP}^{total}(P_{CP},RT_{CP},B_{CP})$ may be calculated according to the attributes of the resources.

In some illustrative embodiments, the service negotiation module may calculate the association relationship according to the following formula:

$$U = \omega_{CR} U_{CR}^{total}(P_{CR},RT_{CR},B_{CR}) + \omega_{CP} U_{CP}^{total}(P_{CP},RT_{CP},B_{CP})$$

wherein $U_{CR}^{total}(P_{CR},RT_{CR},B_{CR}) \ge u_{min}^{CR}$, $u_{min}^{CR}$ may be the minimum utility value of the task request; and $U_{CP}^{total}(P_{CP},RT_{CP},B_{CP}) \ge u_{min}^{CP}$, $u_{min}^{CP}$ may be the minimum utility value of the resources; and $\omega_{CR} + \omega_{CP} = 1$, $\omega_{CR}$ and $\omega_{CP}$ may be respective weights of the second integrated utility value $U_{CR}^{total}(P_{CR},RT_{CR},B_{CR})$ and the third integrated utility value $U_{CP}^{total}(P_{CP},RT_{CP},B_{CP})$; $P_{CP}$ may represent an adjustment factor, and $RT_{CP}$ may represent a response time, and $B_{CP}$ may represent a bandwidth of the resources.

In some illustrative embodiments, the apparatus may also include a second module 204 calculating a second integrated utility value.

In some illustrative embodiments, the second module 204 may calculate the second integrated utility value according to the following formula:

$$U_{total}^{CR}(P_{CR}, RT_{CR}, B_{CR}) = \begin{cases} 0, & U_P^{CR}(P_{CR}) = 0 \text{ or } U_{RT}^{CR}(RT_{CR}) = 0 \text{ or } U_B^{CR}(B_{CR}) = 0 \\ \omega_P^{CR} U_P^{CR}(P_{CR}) + \omega_{RT}^{CR} U_{RT}^{CR}(RT_{CR}) + \omega_B^{CR} U_B^{CR}(B_{CR}), & \text{others} \end{cases}$$

wherein $\omega_P^{CR} + \omega_{RT}^{CR} + \omega_B^{CR} = 1$, and $\omega_P^{CR}$, $\omega_{RT}^{CR}$, and $\omega_B^{CR}$ may be respective weights of the utility value $U_P^{CR}(P_{CR})$ of the adjustment factor $P_{CR}$, the utility value $U_{RT}^{CR}(RT_{CR})$ of the response time $RT_{CR}$, and the utility value $U_B^{CR}(B_{CR})$ of the bandwidth $B_{CR}$ of the task request.

In some illustrative embodiments, the second module 204 may further include an adjustment factor module for task requests 2041, a response time module for task requests 2042, and a bandwidth module for task requests 2043.

The adjustment factor module for task requests 2041 may calculate a utility value of the adjustment factor $P_{CR}$ of the task quest according to the following formula:

$$U_P^{CR}(P_{CR}) = \begin{cases} u_{minP}^{CR} + (1 - u_{minP}^{CR}) \cdot \left| \frac{R_P^{CR} - P_{CR}}{R_P^{CR} - I_P^{CR}} \right|, & I_P^{CR} \le P_{CR} \le R_P^{CR} \\ 0, & \text{others} \end{cases}$$

wherein $u_{min\,P}^{CR}$ may represent the minimum utility value of the adjustment factor of the task request, $I_P^{CR}$ and $R_P^{CR}$ may represent the most expected adjustment factor and the least expected adjustment factor of the task request, respectively.

The response time module for task requests 2042 may calculate a utility value of the response time $RT_{CR}$ of the task request according to the formula:

$$U_{RT}^{CR}(RT_{CR}) = \begin{cases} u_{minRT}^{CR} + (1 - u_{minRT}^{CR}) \cdot \left| \frac{R_{RT}^{CR} - RT_{CR}}{R_{RT}^{CR} - I_{RT}^{CR}} \right|, & I_{RT}^{CR} \le RT_{CR} \le R_{RT}^{CR} \\ 0 & \text{others} \end{cases}$$

wherein $u_{min\,RT}^{CR}$ may represent the minimum utility value of the response time of the task request, $I_{RT}^{CR}$ and $R_{RT}^{CR}$ may represent the most expected response time and the least expected response time of a task request, respectively.

The bandwidth module for task requests 2043 may calculate the utility value of the bandwidth $B_{CR}$ of the task request according to the following formula:

$$U_B^{CR}(B_{CR}) = \begin{cases} u_{minB}^{CR} + (1 - u_{minB}^{CR}) \cdot \left| \frac{u(R_B^{CR}) - u(B_{CR})}{u(R_B^{CR}) - u(I_B^{CR})} \right|, & I_B^{CR} \le B_{CR} \le R_B^{CR} \\ 0 & \text{others} \end{cases}$$

wherein $u_{min\,B}^{CR}$ may represent the minimum utility value of the task request, and $I_B^{CR}$ and $R_B^{CR}$ may represent the most expected bandwidth and the least expected bandwidth of the task request, respectively.

In some illustrative embodiments, $u(B_{CR})$, $u(R_B^{CR})$ and $u(I_B^{CR})$ may be obtained by the following formula:

$$u(X) = \begin{cases} \omega \log X, & I_B^{CR} \le X \le R_B^{CR} \\ 0, & \text{others} \end{cases}$$

wherein $\omega$ may represent the parameter of controlling the shape of a function, and X may be $B_{CR}$, $R_B^{CR}$ or $I_B^{CR}$.

In some illustrative embodiments, the apparatus may also include a third module 205. The third module 205 may obtain a third integrated utility value $U_{CP}^{total}(P_{CP}, RT_{CP}, B_{CP})$ according to the following formula:

$$U_{total}^{CP}(P_{CP}, RT_{CP}, B_{CP}) =$$
$$\begin{cases} 0, & U_P^{CP}(P_{CP}) = 0 \text{ or } U_{RT}^{CP}(RT_{CP}) = 0 \text{ or } U_B^{CP}(B_{CP}) = 0 \\ \omega_P^{CP} U_P^{CP}(P_{CP}) + \omega_{RT}^{CP} U_{RT}^{CP}(RT_{CP}) + \omega_B^{CP} U_B^{CP}(B_{CP}), & \text{others} \end{cases}$$

wherein $\omega_P^{CP} + \omega_{RT}^{CP} + \omega_B^{CP} = 1$, $\omega_P^{CP}$, $\omega_{RT}^{CP}$, and $\omega_B^{CP}$ may be respective weights of the utility value $U_P^{CP}(P_{CP})$ of the adjustment factor $P_{CP}$, the utility value $U_{RT}^{CP}(RT_{CP})$ of the response time $RT_{CP}$ and the utility value $U_B^{CP}(B_{CP})$ of the bandwidth $B_{SP}$ of the resources.

In some illustrative embodiments, the third module 205 may further include an adjustment factor module for resources 2051, a response time module for resources 2052, and a bandwidth module for resources 2053.

The adjustment factor module for resources 2051 may calculate a utility value of the adjustment factor $P_{CP}$ of the resources according to the following formula:

$$U_P^{CR}(P_{CP}) = \begin{cases} u_{minP}^{CP} + (1 - u_{minCP}^{CP}) \cdot \left| \frac{P_{CP} - R_P^{CP}}{I_P^{CP} - R_P^{CP}} \right|, & R_P^{CP} \le P_{CP} \le I_P^{CP} \\ 0, & \text{others} \end{cases}$$

wherein $u_{min\,P}^{CP}$ may represent the minimum utility value of the adjustment factor $P_{CP}$ of the resources, and $I_P^{CP}$ and $R_P^{CP}$ may represent the initial adjustment factor and the reserved adjustment factor of the adjustment factor $P_{CP}$ of the resources, respectively.

The response time module for resources 2052 may calculate a utility value of the response time $RT_{CP}$ of the resources according to the following formula:

$$U_{RT}^{CP}(RT_{CP}) = \begin{cases} u_{minCP}^{CP} + (1 - u_{minCP}^{CP}) \cdot \left| \frac{RT_{CP} - R_{RT}^{CP}}{I_{RT}^{CP} - R_{RT}^{CP}} \right|, & R_{RT}^{CP} \le RT_{CP} \le I_{RT}^{CP} \\ 0, & \text{others} \end{cases}$$

wherein $u_{min\,RT}^{CP}$ may represent the minimum utility value of the response time of the resources, $I_{RT}^{CP}$ and $R_{RT}^{CP}$ may represent the initial response time and the reserved response time of the resources, respectively.

The bandwidth module for resources 2053 may calculate a utility value of bandwidth $B_{CP}$ of the resources according to the following formula:

$$U_B^{CP}(B_{CP}) = \begin{cases} u_{minB}^{CP} + (1 - u_{minB}^{CP}) \cdot \left| \frac{B_{CP} - R_B^{CP}}{I_B^{CP} - R_B^{CP}} \right|, & R_B^{CP} \le B_{CP} \le I_B^{CP} \\ 0, & \text{others} \end{cases}$$

wherein $u_{min\,B}^{CP}$ may represent the minimum utility value of the bandwidth of resources, and $I_B^{CP}$ and $R_B^{CP}$ may represent the initial bandwidth and the reserved bandwidth of resources, respectively.

In some illustrative embodiments, if the service negotiation module 202 determines that the first integrated utility value is not less than the second integrated utility value, the resource allocation module 203 may allocate the current cloud-based media resources to the cloud-based task media request.

In some illustrative embodiments, if there are a plurality of cloud-based media resources, the cloud-based media task request may then correspond to a plurality of first integrated utility values, each of the plurality of first integrated utility values corresponding to a cloud-based media resource. If the service negotiation module 202 determines that the maximum of the plurality of first integrated utility values is not less than the second integrated utility value, the resource allocation module 203 may then allocate the cloud-based media resource corresponding to the maximum to the cloud-based media task request.

In some illustrative embodiments, the apparatus may also include a timeout determination module 206. When the second integrated utility value is zero, the timeout determination module 206 may determine if the timeout of the task request has occurred; if it has occurred, the allocation of the cloud-based media resources may then end. If no timeout has occurred, a concession policy may be executed.

In some illustrative embodiments, the apparatus may also include a concession policy module 207. The concession policy module 207 may repeatedly determine the second integrated utility value until the second integrated utility is not zero.

In some illustrative embodiments, an execution of the concession policy as performed by the concession policy module 207 may include obtaining a second integrated utility of the next task request based on the second integrated utility of the current task request according to the following formula:

$$U_{total}{}^{CR}(P_{CR},RT_{CR},B_{CR})_{t+1} = U_{total}{}^{CR}(P_{CR},RT_{CR},B_{CR})_t \Delta U_{total}{}^{CR}$$

wherein $U_{total}{}^{CR}(P_{CR},RT_{CR},B_{CR})_t$ may be the second integrated utility value of the current task request, and $\Delta U_{total}{}^{CR}$ may be a step size of concessions.

In some illustrated examples, the step size of concessions may be obtained according to the following formula:

$$\Delta U_{total} = U_{total}^t \cdot \left(\frac{t}{\tau}\right)^\lambda$$

wherein $\tau$ may be the cut-off time (the maximum number of negotiations may be determined based on $\tau$), t may be the number of negotiations, and $\lambda$ may be the parameter of controlling concession rates, $0 \leq \lambda \leq 10$.

A simulated example will be described below to further illustrate the above-mentioned methods of the present technology. In the simulated example, on the simulation platform CloudSim as the simulation environment, the performance of Greedy Allocation algorithm, Random Allocation Algorithm and the method provided by the present technology may be evaluated by utilizing the parameters of the cloud-based media task request and the attribute parameters of cloud-based media resources as inputs.

(1) Setting Simulation Parameters

In the simulation example, the algorithms may be evaluated by increasing the number of cloud-based media task requests from 100 to 700, wherein the parameters for task requests may be randomly generated within certain limits by the simulation platform. The generated random numbers may satisfy the following condition:

$$P \leq \alpha \cdot \frac{S_e + S_O}{B \times RT}$$

wherein $S_e$ and $S_o$ may represent the size of the executable job files of the cloud-based media task requests and the size of the result files to be transmitted after execution of the job files, respectively, and $\alpha$ may be the corresponding coefficient, $0 \leq \alpha \leq 1$. The relationship of the adjustment factor, the response time and the bandwidth of cloud-based media services may be reflected by way of setting $\alpha$. The attributes of cloud-based media resources may be divided into different levels, corresponding to different ranges of the adjustment factor, the response time, and the bandwidth. The setting of the parameters may meet the above formula, and other parameters may be set as shown in Table 1. In the example, the price may be used as the adjustment factor.

TABLE 1

Setting of other parameters

| Parameters | Parameter settings |
|---|---|
| $\tau$ | 10 |
| U | $U = (U_{total}{}^{CR}(P_{CR}, RT_{CR}, B_{CR}) + U_{total}{}^{CP})/2$ $\omega_{CR}$ and $\omega_{CP}$ each are 0.5 |
| $U_{total}{}^{CR}$ $(P_{CR}, RT_{CR}, B_{CR})$ | $U_{total}{}^{CR}(P_{CR}, RT_{CR}, B_{CR}) = \omega_P{}^{CR}U_P{}^{CR}(P_{CR}) + \omega_{RT}{}^{CR}U_{RT}{}^{CR}(RT_{CR}) + \omega_B{}^{CR}U_B{}^{CR}(B_{CR})$ $\omega_P{}^{CR}, \omega_{RT}{}^{CR}$ and $\omega_B{}^{CR}$ each are 1/3 |
| $U_{total}{}^{CP}$ $(P_{CP}, RT_{CP}, B_{CP})$ | $U_{total}{}^{CP}(P_{CP}, RT_{CP}, B_{CP}) = \omega_P{}^{CP}U_P{}^{CP}(P_{CP}) + \omega_{RT}{}^{CP}U_{RT}{}^{CP}(RT_{CP}) + \omega_B{}^{CP}U_B{}^{CP}(B_{CP})$ $\omega_P{}^{CP}, \omega_{RT}{}^{CP}$ and $\omega_B{}^{CP}$ each are 1/3 |
| $\alpha$ | 1.2 |

(2) Response Time Analysis of Cloud-Based Media Services

The performance of the overall cloud-based media resource allocation may be evaluated by the execution time of services. In the simulation example, the execution time of cloud-based media services may be thus analyzed. The execution time may be defined by $$Time = \sum_{i=1}^{n} time_i$$

Figure 3:
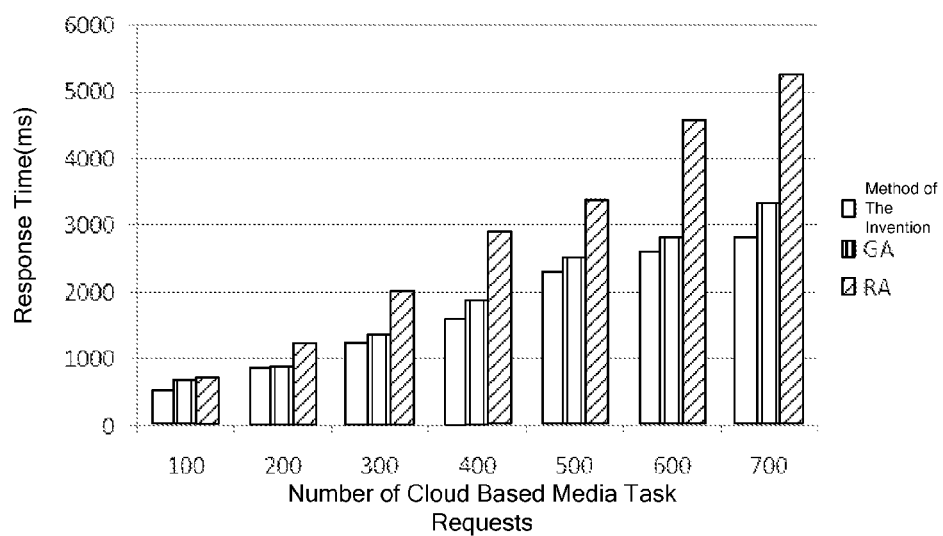
FIG. 3 shows a schematic diagram comparing response times of various cloud-based media services according to some illustrative embodiments of the present technology.

The number of cloud-based media task requests may increase from 100 to 700. In the algorithm of the present technology, the response time and the transmission bandwidth may be used as the parameters of the cloud-based media resource allocation, and the maximum utility values of the parameters may be selected, achieving a good effect of service response time. The specific simulation results are shown as FIG. 3. FIG. 3 exhibits that, at the beginning of cloud-based media services, sufficient resources serve a relatively small number of task requests, and thus the response times of three methods may be substantially the same. As the number of task requests is increasing, the present technology may show well stability and the response times of the present technology may be superior to that of the other two algorithms.

(3) Utility Analysis of Cloud-Based Media Services

The utility values of cloud-based media services may reflect the satisfaction ratings of cloud-based media services. The number of cloud-based media task request may be thus increased from 100 to 700 for analyzing the utility values of cloud-based services. In the present technology, the maximum utility of the cloud-based media resource allocation may be obtained by calculating the utilities of the parameters, thus achieving good utility values of cloud-based media services. Table 2 shows the simulation results.

TABLE 2

Comparison of cloud-based media service utilities

| | | | | | | | |
|---|---|---|---|---|---|---|---|
| The present method | 0.51 | 0.51 | 0.52 | 0.50 | 0.50 | 0.51 | 0.51 |
| GA | 0.31 | 0.29 | 0.29 | 0.30 | 0.29 | 0.30 | 0.31 |
| RA | 0.23 | 0.24 | 0.28 | 0.30 | 0.30 | 0.3 | 0.30 |

Table 2 exhibits that, as the number of cloud-based media task requests increases, the utility values of cloud-based media services provided by the present method may be higher than the other two algorithms. Therefore, the present method may well meet Service Level Agreements and improve satisfaction of cloud-based media services.

(4) Analysis of Different Weight Values of Negotiation Parameters Used in the Present Technology The weight values of the price, the response time and the bandwidth of cloud-based media services may be set respectively. Table 3 shows the set weight values.

TABLE 3 different weight values of cloud-based media services

| Combinations of different weight values | $\omega_P{}^{CR}, \omega_P{}^{CP}$ | $\omega_{RT}{}^{CR}, \omega_{RT}{}^{CP}$ | $\omega_B{}^{CR}, \omega_B{}^{CP}$ |
|---|---|---|---|
| A | 0.2 | 0.6 | 0.2 |
| B | 0.2 | 0.4 | 0.4 |
| C | 0.4 | 0.4 | 0.2 |
| D | 0.4 | 0.2 | 0.4 |

Figure 4:
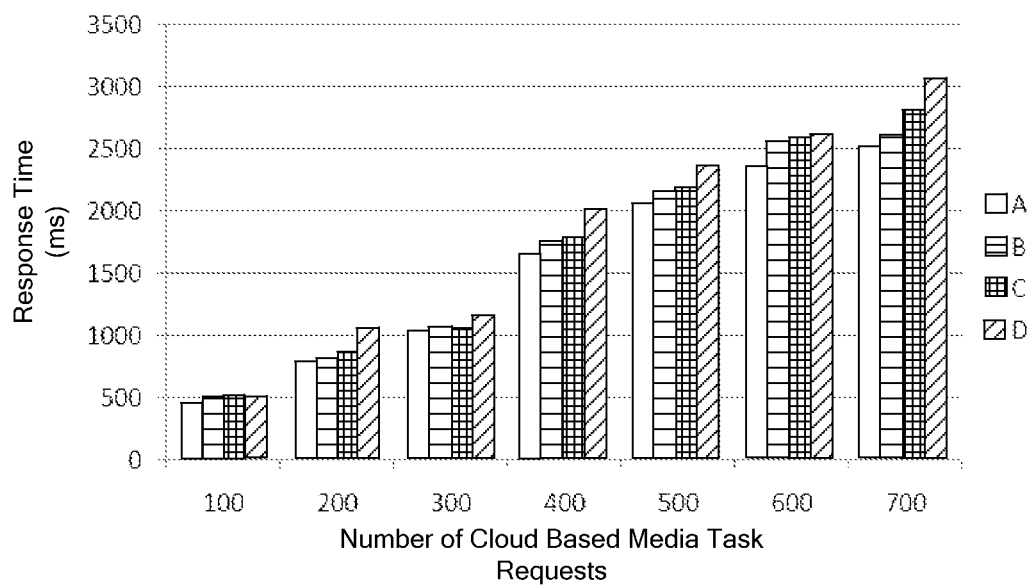
FIG. 4 shows a schematic diagram comparing response times of various cloud-based media services based on different weights of the parameters according to some illustrative embodiments of the present technology.

FIG. 4 and Table 4 respectively illustrate response times and utility values of cloud-based media services based on different weight values according to the method of the present technology. As shown in FIG. 4, the response time may be decreasing with the increasing weight of the response time. Table 4 exhibits that the total utility values obtained according to the method of the present technology may be relatively stable although the weight values of the parameters are changed, which may demonstrate well stability of the present technology.

TABLE 4

Comparison of utility values of cloud-based media services under different weight values of negotiation parameters

| | number of task requests | | | | | | |
|---|---|---|---|---|---|---|---|
| weight | 100 | 200 | 300 | 400 | 500 | 600 | 700 |
| A | 0.59 | 0.58 | 0.59 | 0.59 | 0.59 | 0.59 | 0.59 |
| B | 0.56 | 0.56 | 0.57 | 0.55 | 0.57 | 0.56 | 0.58 |
| C | 0.52 | 0.55 | 0.54 | 0.54 | 0.53 | 0.54 | 0.55 |
| D | 0.51 | 0.53 | 0.51 | 0.53 | 0.52 | 0.49 | 0.51 |

In conclusion, high utility values of services may be obtained by allocating cloud-based media resources according to the method of the present technology, and thus SLAs may be better met and higher service level may be realized, improving satisfaction of cloud-based media services.

It should be readily understood by those skilled in the art that various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software may depend upon the particular application and design constraints imposed on the overall system. Skilled artisans may implement the described functionality in varying ways for each particular application, but such implementation decisions should not be interpreted as causing a departure from the scope of the present technology.

What is claimed is:

1. A method for allocating a cloud-based media resource, comprising:
   receiving a cloud-based media task request with at least one parameter from a task requester;
   calculating a second integrated utility value by utilizing the at least one parameter;
   comparing the second integrated utility value with a first integrated utility value;
   determining whether to allocate a cloud-based media resource to the task requester according to a result of the comparing; and
   allocating the cloud-based media resource to the cloud-based media task request when the first integrated utility value is not less than the second integrated utility value.

2. The method of claim 1, wherein the task request includes the following parameters: an adjustment factor $P_{CR}$, a response time $RT_{CR}$, and a bandwidth $B_{CR}$.

3. The method of claim 2, further comprising:
   calculating an association relationship between the cloud-based media task request and attribute parameters of the cloud-based media resource by utilizing the second integrated utility value $U_{CR}^{total}(P_{CR}, RT_{CR}, B_{CR})$;
   wherein $U_{CR}^{total}(P_{CR}, RT_{CR}, B_{CR})$ is calculated according to all parameters of the cloud-based media task request.

4. The method of claim 3, wherein the second integrated utility value is calculated according to the following formula:

$$U_{total}^{CR}(P_{CR}, RT_{CR}, B_{CR}) = \begin{cases} 0, & U_P^{CR}(P_{CR}) = 0 \text{ or } U_{RT}^{CR}(RT_{CR}) = 0 \\ & \text{or } U_B^{CR}(B_{CR}) = 0 \\ \omega_P^{CR} U_P^{CR}(P_{CR}) + \omega_{RT}^{CR} U_{RT}^{CR}(RT_{CR}) + & \\ \omega_B^{CR} U_B^{CR}(B_{CR}), & \text{others} \end{cases}$$

wherein $\omega_P^{CR} + \omega_{RT}^{CR} + \omega_B^{CR} = 1$, $\omega_P^{CR}$, $\omega_{RT}^{CR}$, and $\omega_B^{CR}$ are respective weights of a utility value $U_P^{CR}(P_{CR})$ of the adjustment factor $P_{CR}$, a utility value $U_{RT}^{CR}(RT_{CR})$ of the response time $RT_{CR}$, and a utility value $U_B^{CR}(B_{CR})$ of the bandwidth $B_{CR}$ of the task request.

5. The method of claim 4, further comprising:
   obtaining the utility value of the adjustment factor $P_{CR}$ of the task request by the following formula:

$$U_P^{CR}(P_{CR}) = \begin{cases} u_{minP}^{CR} + (1 - u_{minCP}^{CR}) \cdot \left| \frac{R_P^{CR} - P_{CR}}{R_P^{CR} - I_P^{CR}} \right|, & I_P^{CR} \leq P_{CR} \leq R_P^{CP} \\ 0, & \text{others} \end{cases}$$

wherein $u_{min\ P}^{CR}$ represents a minimum utility value of the adjustment factor of the cloud-based media task request, $I_P^{CR}$ and $R_P^{CR}$ represent a most expected adjustment factor and a least expected adjustment factor of the task request, respectively;

obtaining the utility value of the response time $RT_{CR}$ of the task request by the following formula:

$$U_{RT}^{CR}(RT_{CR}) = \begin{cases} u_{minRT}^{CR} + (1 - u_{minRT}^{CR}) \cdot \left| \frac{RT_{RT}^{CR} - RT_{CR}}{R_{RT}^{CR} - I_{RT}^{CR}} \right|, & I_{RT}^{CR} \leq RT_{CR} \leq R_{RT}^{CR} \\ 0, & \text{others} \end{cases}$$

wherein $u_{min\ RT}^{CR}$ represents a minimum utility value of the response time of the task request, $I_{RT}^{CR}$ and $R_{RT}^{CR}$ represent a most expected response time and a least expected response time of the task request, respectively;

obtaining the utility value of the bandwidth $B_{CR}$ of the task request by the following formula:

$$U_B^{CR}(B_{CR}) = \begin{cases} u_{minB}^{CR} + (1 - u_{minB}^{CR}) \cdot \left| \frac{u(R_B^{CR}) - u(B_{CR})}{u(R_B^{CR}) - u(I_B^{CR})} \right|, & I_B^{CR} \leq B_{CR} \leq R_B^{CR} \\ 0, & \text{others} \end{cases}$$

wherein $u_{min\ B}^{CR}$ represents a minimum utility value of the task request, and $I_B^{CR}$ and $R_B^{CR}$ represent a most expected bandwidth and a least expected bandwidth of the task request, respectively.

6. The method of claim 5, wherein $u(B_{CR})$, $u(R_B^{CR})$ and $u(I_B^{CR})$ are obtained by the following formula:

$$u(X) = \begin{cases} \omega \log X, & I_B^{CR} \le X \le R_B^{CR} \\ 0, & \text{others} \end{cases}$$

wherein ω represents a parameter for controlling a function shape, and X is $B_{CR}$, $R_B^{CR}$ or $I_B^{CR}$.

7. The method of claim 3, further comprising:
calculating the association relationship by utilizing the second integrated utility value $U_{CR}^{total}(P_{CR},RT_{CR},B_{CR})$ and a third integrated utility value $U_{CP}^{total}(P_{CP},RT_{CP},B_{CP})$;
wherein the third integrated utility value $U_{CP}^{total}(P_{CP},RT_{CP},B_{CP})$ is calculated by the attribute parameters of the cloud-based media resource.

8. The method of claim 7, wherein the third integrated utility value $U_{CP}^{total}(P_{CP},RT_{CP},B_{CP})$ is calculated according to the following formula:

$$U_{total}^{CP}(P_{CP}, RT_{CP}, B_{CP}) = \begin{cases} 0, & U_P^{CP}(P_{CP}) = 0 \text{ or } U_{RT}^{CP}(RT_{CP}) = 0 \\ & \text{ or } U_B^{CP}(B_{CP}) = 0 \\ \omega_P^{CP} U_P^{CP}(P_{CP}) + \omega_{RT}^{CP} U_{RT}^{CP}(RT_{CP}) + \\ \omega_B^{CP} U_B^{CP}(B_{CP}), & \text{others} \end{cases}$$

wherein $\omega_P^{CP}+\omega_{RT}^{CP}+\omega_B^{CP}=1$, $\omega_P^{CP}$, $\omega_{RT}^{CP}$, and $\omega_B^{CP}$ are respective weights of a utility value $U_P^{CP}(P_{CP})$ of adjustment factor $P_{CP}$, a utility value $U_{RT}^{CP}(RT_{CP})$ of response time $RT_{CP}$ and a utility value $U_B^{CP}(B_{CP})$ of bandwidth $B_{CP}$ of the resources.

9. The method of claim 8, further comprising
obtaining the utility value of the adjustment factor $P_{CP}$ of the resource by the following formula:

$$U_P^{CP}(P_{CP}) = \begin{cases} u_{minCP}^{CP} + (1 - u_{minCP}^{CP}) \cdot \left| \frac{P_{CP} - R_P^{CP}}{I_P^{CP} - R_P^{CP}} \right|, & R_P^{CP} \le P_{CP} \le I_P^{CP} \\ 0, & \text{others} \end{cases}$$

wherein $u_{min\ P}^{CP}$ represents a minimum utility value of the adjustment factor $P_{CP}$ of the resource, and $I_P^{CP}$ and $R_P^{CP}$ represent an initial adjustment factor and a reserved adjustment factor of the adjustment factor $P_{CP}$ of the resource, respectively;

obtaining the utility value of the response time $RT_{CP}$ of the resource by the following formula:

$$U_{RT}^{CP}(RT_{CP}) = \begin{cases} u_{minCP}^{CP} + (1 - u_{minCP}^{CP}) \cdot \left| \frac{RT_{CP} - R_{RT}^{CP}}{I_{RT}^{CP} - R_{RT}^{CP}} \right|, & R_{RT}^{CP} \le RT_{CP} \le I_{RT}^{CP} \\ 0, & \text{others} \end{cases}$$

wherein $u_{min\ RT}^{CP}$ represents a minimum utility value of the response time of the resource, $I_{RT}^{CP}$ and $R_{RT}^{CP}$ represent an initial response time and a reserved response time of the resource, respectively;

obtaining the utility value of the bandwidth $B_{CP}$ by the following formula:

$$U_B^{CP}(B_{CP}) = \begin{cases} u_{minB}^{CP} + (1 - u_{minB}^{CP}) \cdot \left| \frac{B_{CP} - R_B^{CP}}{I_B^{CP} - R_B^{CP}} \right|, & R_B^{CP} \le B_{CP} \le I_B^{CP} \\ 0, & \text{others} \end{cases}$$

wherein $u_{min\ B}^{CP}$ represents a minimum utility value of the bandwidth of the resource, and $I_B^{CP}$ and $R_B^{CP}$ represent an initial bandwidth and a reserved bandwidth of the resource, respectively.

10. The method of claim 3, wherein the association relationship is obtained according to the following formula:

$$U=\omega_{CR}U_{CR}^{total}(P_{CR},RT_{CR},B_{CR})+\omega_{CP}U_{CP}^{total}(P_{CP},RT_{CP},B_{CP})$$

wherein U is the first integrated utility value; and $U_{CR}^{total}(P_{CR},RT_{CR},B_{CR}) \ge u_{min}^{CR}$, $u_{min}^{CR}$ is a minimum utility value of the task request; and $U_{CP}^{total}(P_{CP},RT_{CP},B_{CP}) \ge u_{min}^{CP}$, $u_{min}^{CP}$ is a minimum utility value of the resource; and $\omega_{CR}+\omega_{CP}=1$, $\omega_{CR}$ and $\omega_{CP}$ are respective weights of the second integrated utility value $U_{CR}^{total}(P_{CR},RT_{CR},B_{CR})$ and the third integrated utility value $U_{CP}^{total}(P_{CP},RT_{CP},B_{CP})$.

11. The method of claim 1, further comprising:
corresponding the cloud-based task request to a plurality of first integrated utility values when there are a plurality of cloud-based media resources, each of the plurality of first integrated utility values corresponding to a cloud-based media resource; and
if a maximum first integrated utility value is not less than the second integrated utility value, allocating the cloud-based media resource that corresponds to the maximum first integrated utility value to the cloud-based media task request.

12. The method of claim 1, further comprising:
determining if the task request times out when the second integrated utility value is zero.

13. The method of claim 12, wherein the allocating of the cloud-based media resource ends when the task request times out.

14. The method of claim 13, further comprising:
when the task request does not time out, repeatedly determining the second integrated utility value by executing a concession policy until the second integrated utility value is not zero.

15. The method of claim 14, wherein the executing of the concession policy includes:
obtaining a second integrated utility value of a next task request based on a second integrated utility of a current task request by the following formula:

$$U_{total}^{CR}(P_{CR},RT_{CR},B_{CR})_{t+1} = U_{total}^{CR}(P_{CR},RT_{CR},B_{CR})_t - \Delta U_{total}^{CR}$$

wherein $U_{total}^{CR}(P_{CR},RT_{CR},B_{CR})_t$ is the second integrated utility value of the current task request and $\Delta U_{total}^{CR}$ is a step size of concessions.

16. The method of claim 15, wherein the step size of concessions is determined according to the following formula:

$$\Delta U_{total} = U_{total}^t \cdot \left(\frac{t}{\tau}\right)^\lambda$$

wherein τ is a cut-off time, and t is a number of negotiations, and λ is a parameter for controlling a concession rate, $0 \le \lambda \le 10$.

17. An apparatus for allocating a cloud-based media resource, comprising:
- a task scheduling module for receiving a cloud-based media request with at least one parameter from a task requester;
- a second module for calculating a second integrated utility value by utilizing the at least one parameter;
- a service negotiation module for comparing the second integrated utility value with a first integrated utility value; and
- a resource allocation module for determining whether to allocate the cloud-based media resource to the task requester according to a result of the comparing, wherein the resource allocation module allocates the cloud-based media resource to the cloud-based media request when the service negotiation module determines that the first integrated utility value is not less than the second integrated utility value.

18. The apparatus of claim 17, wherein the task request includes the following parameters: an adjustment factor $P_{CR}$, a response time $RT_{CR}$, and a bandwidth $B_{CR}$.

19. The apparatus of claim 18, wherein the service negotiation module calculates an association relationship between the cloud-based media task request and attribute parameters of the cloud-based media resource by utilizing the second integrated utility value $U_{CR}^{total}(P_{CR}, RT_{CR}, B_{CR})$;
wherein the second integrated utility value $U_{CR}^{total}(P_{CR}, RT_{CR}, B_{CR})$ is obtained based on all parameters of the cloud-based media task request.

20. The apparatus of claim 17, wherein the second module calculates the second integrated utility value according to the following formula:

$$U_{total}^{CR}(P_{CR}, RT_{CR}, B_{CR}) = \begin{cases} 0, & U_P^{CR}(P_{CR}) = 0 \text{ or } U_{RT}^{CR}(RT_{CR}) = 0 \\ & \text{or } U_B^{CR}(B_{CR}) = 0 \\ \omega_P^{CR} U_P^{CR}(P_{CR}) + \omega_{RT}^{CR} U_{RT}^{CR}(RT_{CR}) + & \text{others} \\ \omega_B^{CR} U_B^{CR}(B_{CR}), & \end{cases}$$

wherein $\omega_P^{CR} + \omega_{RT}^{CR} + \omega_B^{CR} = 1$, and $\omega_P^{CR}$, $\omega_{RT}^{CR}$, and $\omega_B^{CR}$ are respective weights of a utility value $U_P^{CR}(P_{CR})$ of an adjustment factor $P_{CR}$, a utility value $U_{RT}^{CR}(RT_{CR})$ of a response time $RT_{CR}$, and a utility value $U_B^{CR}(B_{CR})$ of a bandwidth $B_{CR}$ of the task request.

21. The apparatus of claim 20, wherein the second module includes:
an adjustment factor module for the task request configured to calculate a utility value of the adjustment factor $P_{CR}$ of the task quest according to the following formula:

$$U_P^{CR}(P_{CR}) = \begin{cases} u_{minP}^{CR} + (1 - u_{minP}^{CR}) \cdot \left| \frac{R_P^{CR} - P_{CR}}{R_P^{CR} - I_P^{CR}} \right|, & I_P^{CR} \leq P_{CR} \leq R_P^{CR} \\ 0, & \text{others} \end{cases}$$

wherein $u_{min\ P}^{CR}$ represents a minimum utility value of the adjustment factor of the task request, $I_P^{CR}$ and $R_P^{CR}$ represent a most expected adjustment factor and a least expected adjustment factor of the task request, respectively;

a response time module for the task request configured to calculate a utility value of the response time $RT_{CR}$ of the task request according to the following formula:

$$U_{RT}^{CR}(RT_{CR}) = \begin{cases} u_{minRT}^{CR} + (1 - u_{minRT}^{CR}) \cdot \left| \frac{R_{RT}^{CR} - RT_{CR}}{R_{RT}^{CR} - I_{RT}^{CR}} \right|, & I_{RT}^{CR} \leq RT_{CR} \leq R_{RT}^{CR} \\ 0, & \text{others} \end{cases}$$

wherein $u_{min\ RT}^{CR}$ represents a minimum utility value of the response time of the task request, $I_{RT}^{CR}$ and $R_{RT}^{CR}$ represent a most expected response time and a least expected response time of the task request, respectively; and a bandwidth module for the task request configured to calculate a utility value of the bandwidth $B_{CR}$ of the task request according to the following formula:

$$U_B^{CR}(B_{CR}) = \begin{cases} u_{minB}^{CR} + (1 - u_{minB}^{CR}) \cdot \left| \frac{u(R_B^{CR}) - u(B_{CR})}{u(R_B^{CR}) - u(I_B^{CR})} \right|, & I_B^{CR} \leq B_{CR} \leq R_B^{CR} \\ 0, & \text{others} \end{cases}$$

wherein $u_{min\ B}^{CR}$ represents a minimum utility value of the bandwidth of the task request, and $I_B^{CR}$ and $R_B^{CR}$ represent a most expected bandwidth and a least expected bandwidth of the task and request, respectively.

22. The apparatus of claim 21, wherein $u(B_{CR})$, $u(R_B^{CR})$ and $u(I_B^{CR})$ are obtained by the following formula:

$$u(X) = \begin{cases} \omega \log X, & I_B^{CR} \leq X \leq R_B^{CR} \\ 0, & \text{others} \end{cases}$$

wherein $\omega$ represents a parameter for controlling a function shape, and X is $B_{CR}$, $R_B^{CR}$ or $I_B^{CR}$.

23. The apparatus of claim 19, wherein the service negotiation module calculates the association relationship according to the second integrated utility value $U_{CR}^{total}(P_{CR}, RT_{CR}, B_{CR})$ and a third integrated utility value $U_{CP}^{total}(P_{CP}, RT_{CP}, B_{CP})$;
wherein the third integrated utility value $U_{CP}^{total}(P_{CP}, RT_{CP}, B_{CP})$ is calculated by the attribute parameters of the cloud-based media resources.

24. The apparatus of claim 23, further comprising:
a third module for obtaining the third integrated utility value $U_{CP}^{total}(P_{CP}, RT_{CP}, B_{CP})$ according to the following formula:

$$U_{total}^{CP}(P_{CP}, RT_{CP}, B_{CP}) = \begin{cases} 0, & U_P^{CP}(P_{CP}) = 0 \text{ or } U_{RT}^{CP}(RT_{CP}) = 0 \\ & \text{or } U_B^{CP}(B_{CP}) = 0 \\ \omega_P^{CP} U_P^{CP}(P_{CP}) + \omega_{RT}^{CP} U_{RT}^{CP}(RT_{CP}) + & , \quad \text{others} \\ \omega_B^{CP} U_B^{CP}(B_{CP}) & \end{cases}$$

wherein $\omega_P^{CP} + \omega_{RT}^{CP} + \omega_B^{CP} = 1$, $\omega_P^{CP}$, $\omega_{RT}^{CP}$, and $\omega_B^{CP}$ are respective weights of a utility value $U_P^{CP}(P_{CP})$ of the adjustment factor $P_{CP}$, a utility value $U_{RT}^{CP}(RT_{CP})$ of the response time $RT_{CP}$ and a utility value $U_B^{CP}(B_{CP})$ of the bandwidth $B_{CP}$ of the resource.

25. The apparatus of claim 24, wherein the third module further includes:
an adjustment factor module for the resource configured to calculate the utility value of the adjustment factor $P_{CP}$ of the resource according to the following formula:

$$U_P^{CP}(P_{CP}) = \begin{cases} u_{minCP}^{CP} + (1 - u_{minCP}^{CP}) \cdot \left| \dfrac{P_{CP} - R_P^{CP}}{I_P^{CP} - R_P^{CP}} \right|, & R_P^{CP} \leq P_{CP} \leq I_P^{CP} \\ 0, & \text{others} \end{cases}$$

wherein $u_{min\ P}^{CP}$ represents a minimum utility value of the adjustment factor $P_{CP}$ of the resource, and $I_P^{CP}$ and $R_P^{CP}$ represent an initial adjustment factor and a reserved adjustment factor of the adjustment factor $P_{CP}$ of the resource, respectively;
a response time module for the resource configured to calculate the utility value of the response time $RT_{CP}$ of the resource according to the following formula:

$$U_{RT}^{CP}(RT_{CP}) = \begin{cases} u_{minCP}^{CP} + (1 - u_{minCP}^{CP}) \cdot \left| \dfrac{RT_{CP} - R_{RT}^{CP}}{I_{RT}^{CP} - R_{RT}^{CP}} \right|, & R_{RT}^{CP} \leq RT_{CP} \leq I_{RT}^{CP} \\ 0, & \text{others} \end{cases}$$

wherein $u_{min\ RT}^{CP}$ represents a minimum utility value of the response time of the resource, $I_{RT}^{CP}$ and $R_{RT}^{CP}$ represent an initial response time and a reserved response time of the resource, respectively; and
a bandwidth module for the resource configured to calculate the utility value of the bandwidth $B_{CP}$ of the resource according to the following formula:

$$U_B^{CP}(B_{CP}) = \begin{cases} u_{minB}^{CP} + (1 - u_{minB}^{CP}) \cdot \left| \dfrac{B_{CP} - R_B^{CP}}{I_B^{CP} - R_B^{CP}} \right|, & R_B^{CP} \leq B_{CP} \leq I_B^{CP} \\ 0, & \text{others} \end{cases}$$

wherein $u_{min\ B}^{CP}$ represents a minimum utility value of the bandwidth of the resource, and $I_B^{CP}$ and $R_B^{CP}$ represent an initial bandwidth and a reserved bandwidth of the resource, respectively.

26. The apparatus of claim 23, wherein the service negotiation module calculates the association relationship according to the following formula:

$$U = \omega_{CR} U_{CR}^{total}(P_{CR}, RT_{CR}, B_{CR}) + \omega_{CP} U_{CP}^{total}(P_{CP}, RT_{CP}, B_{CP})$$

wherein U is the first integrated utility value; and $U_{CR}^{total}(P_{CR}, RT_{CR}, B_{CR}) \geq u_{min}^{CR}$, $u_{min}^{CR}$ is a minimum utility value of the task request; and $U_{CP}^{total}(P_{CP}, RT_{CP}, B_{CP}) \geq u_{min}^{CP}$, $u_{min}^{CP}$ is a minimum utility value of the resource; and $\omega_{CR} + \omega_{CP} = 1$, $\omega_{CR}$ and $\omega_{CP}$ are respective weights of the second integrated utility value $U_{CR}^{total}(P_{CR}, RT_{CR}, B_{CR})$ and the third integrated utility value $U_{CP}^{total}(P_{CP}, RT_{CP}, B_{CP})$.

27. The apparatus of claim 17, wherein the cloud-based media task request corresponds to a plurality of first integrated utility values when there are a plurality of cloud-based media resources, each of the plurality of first integrated utility values corresponding to a cloud-based media resource; and
wherein if the service negotiation module determines that a maximum first integrated utility value is not less than the second integrated utility value, the resource allocation module allocates the cloud-based media resource corresponding to the maximum first integrated utility value to the task request.

28. The apparatus of claim 17, further comprising:
a timeout determination module for determining if the task request times out when the second integrated utility value is zero;
wherein if the task request times out, the allocating of the cloud-based media resource ends; and wherein if the task request does not time out, a concession policy is executed.

29. The apparatus of claim 28, further comprising:
a concession policy module for repeatedly determining the second integrated utility value until the second integrated utility value is not zero.

30. The apparatus of claim 29, wherein the concession policy module executes the concession policy as follows:
obtaining a second integrated utility of a next task request based on a second integrated utility of a current task request by the following formula:

$$U_{total}^{CR}(P_{CR}, RT_{CR}, B_{CR})_{t+1} = U_{total}^{CR}(P_{CR}, RT_{CR}, B_{CR})_t - \Delta U_{total}^{CR}$$

wherein $U_{total}^{CR}(P_{CR}, RT_{CR}, B_{CR})_t$ is the second integrated utility value of the current task request, and $\Delta U_{total}^{CR}$ is a step size of concessions.

31. The apparatus of claim 30, wherein the step size of concessions is determined according to the following formula:

$$\Delta U_{total} = U_{total}^t \cdot \left( \dfrac{t}{\tau} \right)^{\lambda}$$

wherein $\tau$ is a cut-off time, and t is a number of negotiations, and $\lambda$ is a parameter for controlling concession rates, $0 \leq \lambda \leq 10$.

* * * * *